(12) United States Patent
Wang et al.

(10) Patent No.: US 8,892,382 B2
(45) Date of Patent: Nov. 18, 2014

(54) SYSTEMS AND METHODS FOR CONDITION-BASED POWER PLANT SENSOR CALIBRATION

(75) Inventors: Difei Wang, Atlanta, GA (US); Erwing Calleros, Atlanta, GA (US); Rahul J. Chillar, Atlanta, GA (US); Julio Mestroni, Marietta, GA (US)

(73) Assignee: General Electric Company, Schenectady, NY (US)

( * ) Notice: Subject to any disclaimer, the term of this patent is extended or adjusted under 35 U.S.C. 154(b) by 557 days.

(21) Appl. No.: 13/245,486

(22) Filed: Sep. 26, 2011

(65) Prior Publication Data

US 2013/0080100 A1 Mar. 28, 2013

(51) Int. Cl.
*G06F 19/00* (2011.01)
*G05B 23/02* (2006.01)

(52) U.S. Cl.
CPC .................................. *G05B 23/0208* (2013.01)
USPC ........................................................ 702/85

(58) Field of Classification Search
CPC ............ G06F 3/00; G06F 11/00; G06F 19/00
USPC .......................... 702/117, 118, 182–185, 188
See application file for complete search history.

(56) References Cited

U.S. PATENT DOCUMENTS

| | | | |
|---|---|---|---|
| 5,396,440 A | 3/1995 | Coburn | |
| 7,702,401 B2 | 4/2010 | Eryurek | |
| 2005/0096873 A1* | 5/2005 | Klein | 702/184 |
| 2009/0043447 A1 | 2/2009 | Vershinin | |

FOREIGN PATENT DOCUMENTS

EP 0340749 A2 11/1989

* cited by examiner

*Primary Examiner* — Edward Raymond
(74) *Attorney, Agent, or Firm* — Sutherland Asbill & Brennan LLP (57) ABSTRACT

Embodiments of the invention can provide systems and methods for condition-based power plant sensor calibration. According to one embodiment of the invention, a system can be provided. The system can include a computer processor. The system can also include a memory operable to store computer-executable instructions operable to: receive data from the one or more power plant sensors; reconcile detected errors within the data from the one or more power plant sensors; calibrate the one or more power plant sensors based at least in part on the detected errors within the data; generate at least one performance model based at least in part on the reconciled data from the one or more power plant sensors; detect anomalies within the at least one performance model; and tune the at least one performance model to account for the anomalies.

20 Claims, 4 Drawing Sheets

SYSTEMS AND METHODS FOR CONDITION-BASED POWER PLANT SENSOR CALIBRATION

FIELD OF THE INVENTION

Embodiments of the invention relate generally to power plants, and more particularly to systems and methods for condition-based power plant sensor calibration.

BACKGROUND OF THE INVENTION

Sensor calibration is a routine activity at power plants to ensure reliable control and operation of the power plants. Traditional calibration schedules are fixed or determined by other maintenance schedules. Sensors are checked and calibrated according to the schedule regardless of whether the sensors actually need to be calibrated. On the other hand, sensors that need to be calibrated are not checked and calibrated until the next schedule.

BRIEF DESCRIPTION OF THE INVENTION

Some or all of the above needs and/or problems may be addressed by certain embodiments of the invention. Disclosed embodiments may include systems and methods for condition-based power plant sensor calibration. According to one embodiment of the invention, there is disclosed a method for condition-based power plant sensor calibration. The method can include receiving data from one or more power plant sensors; reconciling errors detected within the data from the one or more power plant sensors; calibrating the one or more power plant sensors based at least in part on the errors detected within the data; generating at least one performance model based at least in part on the reconciled data from the one or more power plant sensors; detecting anomalies within the at least one performance model; and tuning the at least one performance model to account for the anomalies.

According to another embodiment of the invention, there is disclosed a system for condition-based power plant sensor calibration. The system can include a computer processor. The system can also include a memory in communication with the computer processor and operable to store computer-executable instructions operable to: receive data from one or more power plant sensors; reconcile errors detected within the data from the one or more power plant sensors; calibrate the one or more power plant sensors based at least in part on the errors detected within the data; generate at least one performance model based at least in part on the reconciled data from the one or more power plant sensors; detect anomalies within the at least one performance model; and tune the at least one performance model to account for the anomalies.

Further, according to another embodiment of the invention, there is disclosed a system for condition-based power plant sensor calibration. The system can include one or more power plant sensors. The system can also include a computer processor. Moreover, the system can include a memory in communication with the computer processor and operable to store power plant data as well as computer-executable instructions operable to: receive data from the one or more power plant sensors; reconcile detected errors within the data from the one or more power plant sensors; calibrate the one or more power plant sensors based at least in part on the detected errors within the data; generate at least one performance model based at least in part on the reconciled data from the one or more power plant sensors; detect anomalies within the at least one performance model; and tune the at least one performance model to account for the anomalies.

Other embodiments, aspects, and features of the invention will become apparent to those skilled in the art from the following detailed description, the accompanying drawings, and the appended claims.

BRIEF DESCRIPTION OF THE DRAWINGS

Reference will now be made to the accompanying drawings, which are not necessarily drawn to scale, and wherein.

DETAILED DESCRIPTION OF THE INVENTION

Illustrative embodiments of the invention will now be described more fully hereinafter with reference to the accompanying drawings, in which some, but not all embodiments of the invention are shown. The invention may be embodied in many different forms and should not be construed as limited to the embodiments set forth herein; rather, these embodiments are provided so that this disclosure will satisfy applicable legal requirements. Like numbers refer to like elements throughout.

Illustrative embodiments of the invention are directed to, among other things, systems and methods for condition-based power plant sensor calibration. Certain illustrative embodiments of the invention may be directed to receiving data from one or more power plant sensors; reconciling errors detected within the data from the one or more power plant sensors; calibrating the one or more power plant sensors based at least in part on the errors detected within the data; generating at least one performance model based at least in part on the reconciled data from the one or more power plant sensors; detecting anomalies within the at least one performance model; and tuning the at least one performance model to account for the anomalies.

In one embodiment, reconciling errors detected within the data from the one or more power plant sensors can be based at least in part on accessing at least one database of calibration history and trends for the one or more power plant sensors. The errors detected within the data from the one or more power plant sensors can be based at least in part on sensor drifting. In some embodiments, an optimal calibration interval can be determined for the one or more power plant sensors based at least in part on the errors detected within the data.

In another embodiment, detecting anomalies within the at least one performance model can be based at least in part on accessing at least one database of known performance models or actual power plant performance results. The detected anomalies within the at least one performance model can be based at least in part on equipment performance degradation.

Certain embodiments of the invention can provide a technical solution to calibrating power plant sensors, and more particularly to facilitating detection and distinction between equipment performance degradation and sensor drifting through data reconciliation and performance model anomaly detection. The integration of sensor error reconciliation and performance model anomaly detection enables the identification of true performance degradation versus sensor issues when an anomaly is detected. Moreover, certain embodiments of the invention can reduce the frequency of sensor calibration by calibrating only those sensors that need calibrating.

Figure 1:
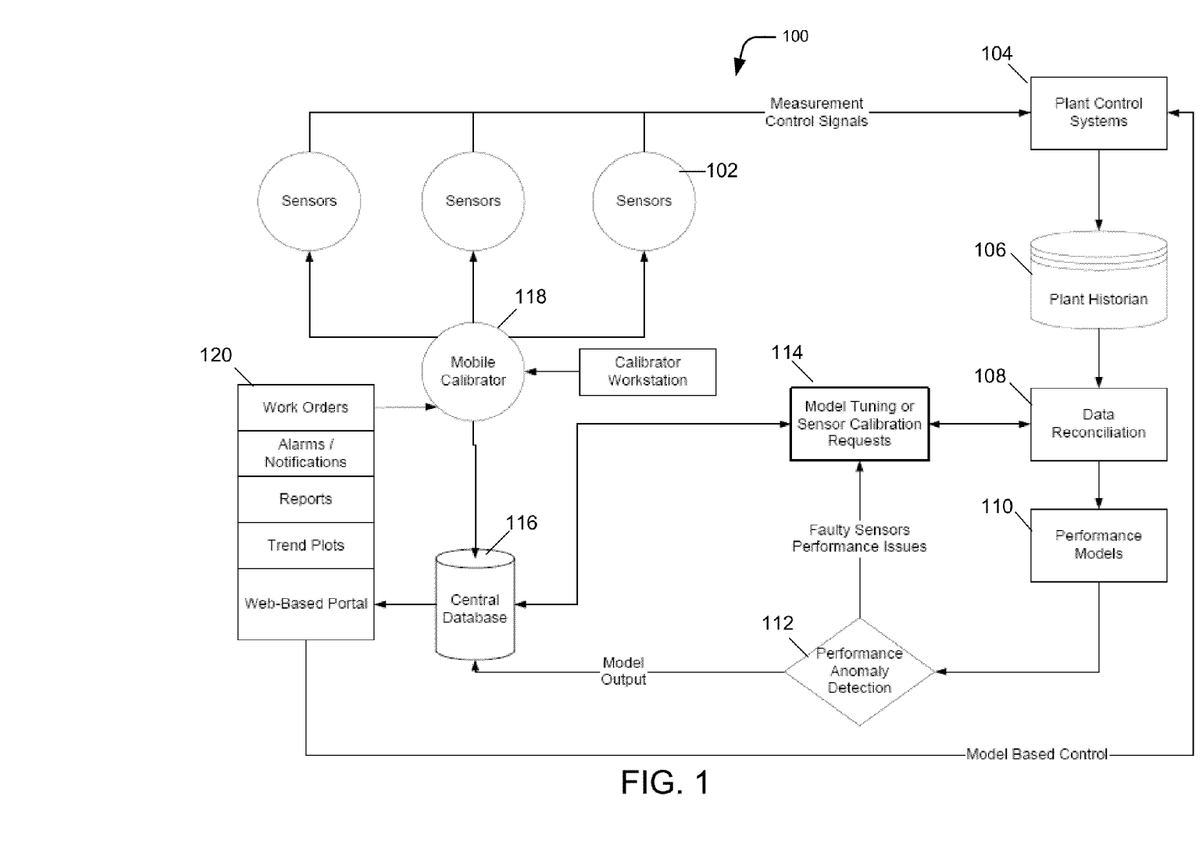
FIG. 1 is a schematic illustrating details of an example data flow for implementing condition-based power plant sensor calibration, according to an embodiment of the invention.

FIG. 1 is a schematic illustrating details of an example data flow 100 for implementing condition-based power plant sensor calibration. In data flow 100, one or more power plant sensors 102 monitor various components of the power plant. In one embodiment, the one or more power plant sensors 102 may transmit data regarding the various components of the power plant to the power plant control system 104 and the power plant historian 106.

In certain embodiments, the data received from the one or more power plant sensors 102 may be analyzed for errors. Errors detected within the data from the one or more power plant sensors 102 can be reconciled 108 based at least in part on accessing at least one database 116 of calibration history and trends for the one or more power plant sensors 102, i.e., the received data from the one or more power plant sensors 102 may be compared to the calibration history and trends for the one or more power plant sensors 102 stored in the database 116 to detect errors. In certain embodiments, the errors detected within the data from the one or more power plant sensors 102 can be based at least in part on sensor drifting.

As previously stated, in certain embodiments of data flow 100, the errors detected within the data from the one or more power plant sensors 102 can be reconciled 108, meaning, for example, if one or more power plant sensors 102 are providing conflicting data regarding components of the power plant, the one or more power plant sensors 102 that are known to be more reliable, based at least in part on the calibration history and trends of the one or more power plant sensors 102 stored in the database 116, can be given more weight when calculating, for example, a performance model.

In certain embodiments, at least one performance model 110 can be generated based at least in part on the reconciled data 108 from the one or more power plant sensors 102. As discussed above, the random errors detected in the data received from the one or more power plant sensors 102 can be reconciled. The reconciled data 108 provides consistent input data for generating the at least one performance model 110. The at least one performance model 110 is used to model power plant performance as a whole or to model the performance of individual components of the power plant.

In certain embodiments, the at least one performance model 110 is analyzed for anomalies 112. For example, detecting anomalies 112 within the at least one performance model 110 can be based at least in part on accessing at least one database 116 of known performance models or actual power plant performance results. The at least one performance model 110 may then be compared to the known performance models or actual power plant performance results stored in the database 116 to detect anomalies 112. The detected anomalies 112 within the at least one performance model 110 can be based at least in part on equipment performance degradation.

In certain embodiments, the one or more power plant sensors are calibrated 118 based at least in part on the errors detected and reconciled 108 within the data. For example, when errors are detected in the data received from the one or more power plant sensors 102 as discussed above, a calibration request 114 may be generated. A notification 120 may then be provided to calibrate 118 the one or more power plant sensors 102 to account for sensor drifting. Similarly, when anomalies are detected in the at least one performance model 110 as discussed above, a tuning request 114 may be generated. A notification 120 may then be provided to tune the at least one performance model 110 to account for the power plant equipment degradation. Moreover, in certain embodiments, when anomalies are detected in the at least one performance model 110, a sensor calibration request 14 may also be generated to ensure that the anomaly is the result of true performance degradation and not a sensor issue.

Figure 2:
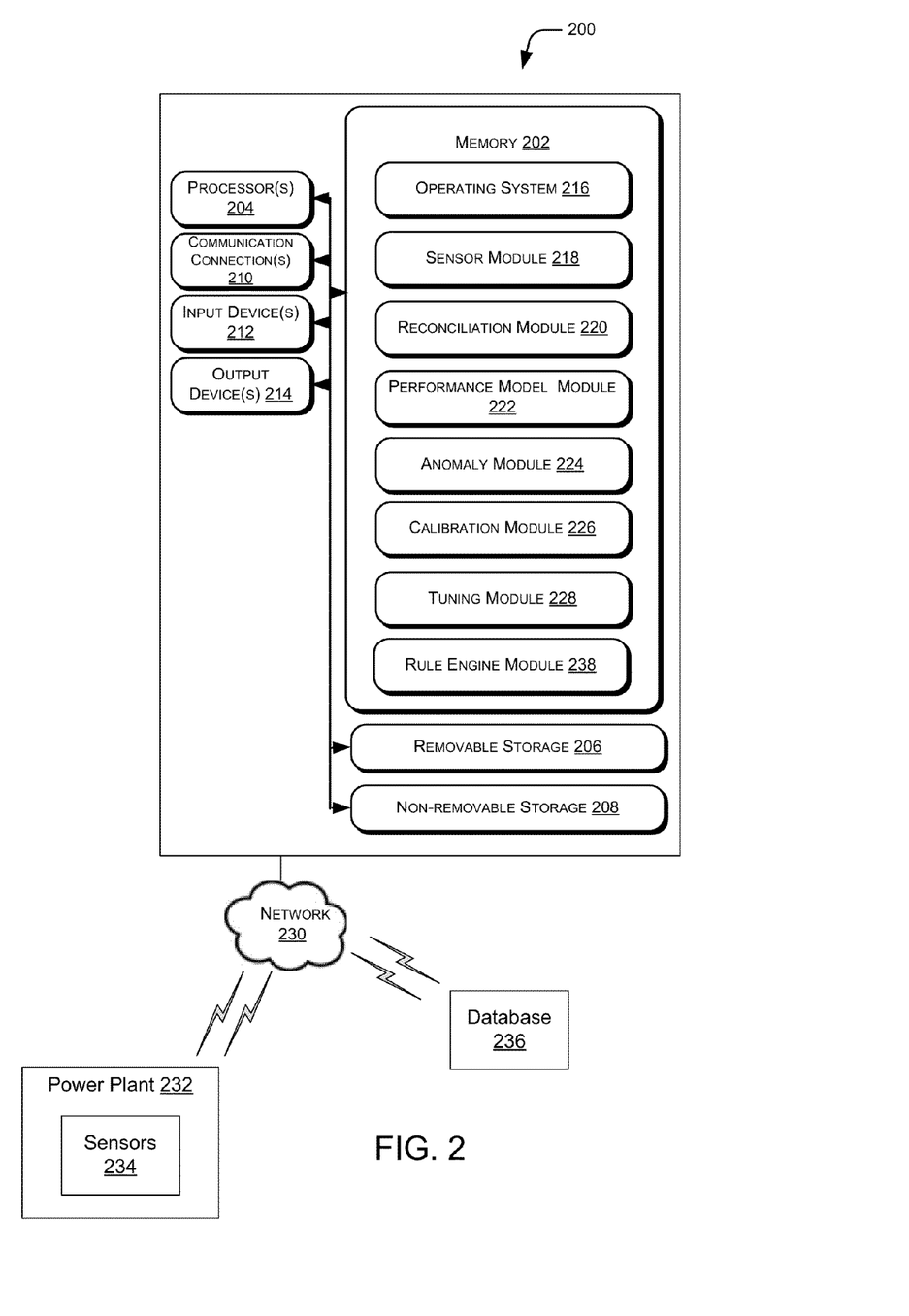
FIG. 2 is a schematic illustrating details of an example system including a block diagram of a computer environment for implementing condition-based power plant sensor calibration, according to an embodiment of the invention.

FIG. 2 provides an illustrative overview of a system, including one computing device 200, according to an embodiment of the invention. The computing device 200 may be configured as any suitable computing device capable of implementing the disclosed features, and accompanying methods, such as, but not limited to, those described with reference to FIG. 2. By way of example and not limitation, suitable computing devices may include personal computers (PCs), servers, server farms, data centers, or any other device capable of storing and executing all or part of the disclosed features.

In one illustrative configuration, the computing device 200 comprises at least a memory 202 and one or more processing units (or processor(s)) 204. The processor(s) 204 may be implemented as appropriate in hardware, software, firmware, or combinations thereof. Software or firmware implementations of the processor(s) 204 may include computer-executable or machine-executable instructions written in any suitable programming language to perform the various functions described.

Memory 202 may store program instructions that are loadable and executable on the processor(s) 204, as well as data generated during the execution of these programs. Depending on the configuration and type of computing device 200, memory 202 may be volatile (such as random access memory (RAM)) and/or non-volatile (such as read-only memory (ROM), flash memory, etc.). The computing device or server may also include additional removable storage 206 and/or non-removable storage 208 including, but not limited to, magnetic storage, optical disks, and/or tape storage. The disk drives and their associated computer-readable media may provide non-volatile storage of computer-readable instructions, data structures, program modules, and other data for the computing devices. In some implementations, the memory 202 may include multiple different types of memory, such as static random access memory (SRAM), dynamic random access memory (DRAM), or ROM.

Memory 202, removable storage 206, and non-removable storage 208 are all examples of computer-readable storage media. For example, computer-readable storage media may include volatile and non-volatile, removable and non-removable media implemented in any method or technology for storage of information such as computer-readable instructions, data structures, program modules or other data. Memory 202, removable storage 206, and non-removable storage 208 are all examples of computer storage media. Additional types of computer storage media that may be present include, but are not limited to, programmable random access memory (PRAM), SRAM, DRAM, RAM, ROM, electrically erasable programmable read-only memory (EEPROM), flash memory or other memory technology, compact disc read-only memory (CD-ROM), digital versatile discs (DVD) or other optical storage, magnetic cassettes, magnetic tape, magnetic disk storage or other magnetic storage devices, or any other medium which can be used to store the desired information and which can be accessed by the server or other computing device. Combinations of any of above should also be included within the scope of computer-readable media.

Alternatively, computer-readable communication media may include computer-readable instructions, program modules, or other data transmitted within a data signal, such as a carrier wave, or other transmission.

The computing device 200 may also contain communication connection(s) 210 that allow the computing device 200 to communicate with a stored database, another computing device or server, user terminals, and/or other devices on a network 230. The computing device 200 may also include input device(s) 212, such as a keyboard, mouse, pen, voice input device, touch input device, etc., and output device(s) 214, such as a display, speakers, printer, etc.

Turning to the contents of the memory 202 in more detail, the memory 202 may include an operating system 216 and one or more application programs or services for implementing the features disclosed herein including a sensor module 218. The sensor module 218 may be configured to receive data from one or more power plant sensors 234. Additionally, the sensor module 218 may store the received data from the one or more power plant sensors 234 in the memory 202. An example of data received by the sensor module 218 can include measurements of various components of the power plant 232. For example, the sensor module 218 can receive data from one or more power plant sensors 234 monitoring turbines, pumps, heat exchangers, and/or other components of the power plant 232. For example, in some embodiments, the data collected or otherwise received from the one or more power plant sensors 234 can include, but is not limited to, one or more: temperatures of various fluids and metals of the power plant 232; pressures of various fluids and equipment contained within systems and subsystems of the power plant 232; and/or flow rates of various fluids within systems and subsystems of the power plant 232.

The memory 202 may further include a reconciliation module 220. The reconciliation module 220 may be configured to reconcile errors detected within the data from the one or more power plant sensors 234. Additionally, the reconciliation module 220 may store the reconciled data in the memory 202. The reconciliation module 220 facilitates consistent data by minimizing random errors prior to generating the performance model discussed below. For example, reconciling errors detected within the data from the one or more power plant sensors 234 can be based at least in part on accessing at least one database 236 of the calibration history and trends for the one or more power plant sensors 234. The received data from the one or more power plant sensors 234 may then be compared to the calibration history and trends for the one or more power plant sensors 234 to detect errors. The reconciliation module 220 may then disregard or give less weight to the data received from the one or more sensors 234 that indicate an error. The errors detected within the data from the one or more power plant sensors 234 can be based at least in part on sensor drifting.

The memory 202 may also include a calibration module 226. The calibration module 226 may be configured to calibrate the one or more power plant sensors 234 based at least in part on the errors detected within the data in reconciliation module 220. The calibration module 226 may also be configured to calibrate the one or more power plant sensors 234 when anomalies are detected in the performance model anomaly module 224 as discussed below to ensure that the anomaly is the result of true performance degradation and not a sensor issue. The calibration module 226 my further be configured to remotely calibrate the one or more power plant sensors 234 or issue an alert or work order for the one or more sensors 234 to be manually calibrated. In some embodiments, for example, the calibration module may also be configured to determine an optimal maintenance or calibration interval for the one or more power plant sensors 234 based at least in part on the errors detected within the data in reconciliation module 220.

The memory 202 may also include a performance model module 222. The performance model module 222 may be configured to generate at least one performance model based at least in part on the reconciled data from the one or more power plant sensors 234 in reconciliation module 220. As discussed above, the reconciliation module 220 minimizes random errors from the data received from the one or more power plant sensors 234. The reconciliation module 220 delivers consistent input data for generating the at least one performance model. The at least one performance model is used to model power plant performance as a whole or to model the performance of individual components of the power plant.

The memory 202 may also include an anomaly module 224. The anomaly module 224 may be configured to detect anomalies within the at least one performance model. Additionally, the anomaly module 224 may store the detected anomalies in the memory 202. For example, detecting anomalies within the at least one performance model can be based at least in part on accessing at least one database 236 of known performance models or actual power plant performance results. The at least one performance model may then be compared to the known performance models or actual power plant performance results to detect anomalies. The detected anomalies within the at least one performance model can be based at least in part on equipment performance degradation. Using this information, an optimal maintenance or calibration interval may be determined for degrading or malfunctioning power plant equipment.

The memory 202 may also include a tuning module 228. The tuning module 228 may be configured for tuning the at least one performance model to account for the anomalies. In some embodiments, the anomalies in the at least one performance model can be based at least in part on power plant equipment degradation. Accordingly, the at least one performance model can be tuned or adjusted to account for the power plant equipment degradation.

The memory 202 may also include a rule engine module 238. The rule engine module 238 may be configured to provide an overall system level application. The system level application can link data flow/information, execute rules, and manage notifications/alarms regarding the one or more sensors and/or performance models.

Various instructions, methods and techniques described herein may be considered in the general context of computer-executable instructions, such as program modules, executed by one or more computers or other devices. Generally, program modules include routines, programs, objects, components, data structures, etc., for performing particular tasks or implementing particular abstract data types. These program modules and the like may be executed as native code or may be downloaded and executed, such as in a virtual machine or other just-in-time compilation execution environment. Typically, the functionality of the program modules may be combined or distributed as desired in various embodiments. An implementation of these modules and techniques may be stored on some form of computer-readable storage media.

The example computing device 200 shown in FIG. 2 is provided by way of example only. Numerous other operating environments, system architectures, and device configurations are possible. Accordingly, embodiments of the present disclosure should not be construed as being limited to any particular operating environment, system architecture, or device configuration.

Still referring to FIG. 2, by way of example, the computing device 200 can be in communication with the power plant 232 via a network 230. The power plant 232 may include one or more sensors 234 or other means or devices for monitoring, detecting, and/or transmitting data regarding the power plant as a whole or individual components of the power plant. Certain illustrative embodiments of the invention may be directed towards the computing device 200 determining power plant equipment performance degradation and/or one or more power plant sensors drifting through data reconciliation and anomaly detection.

Figure 3:
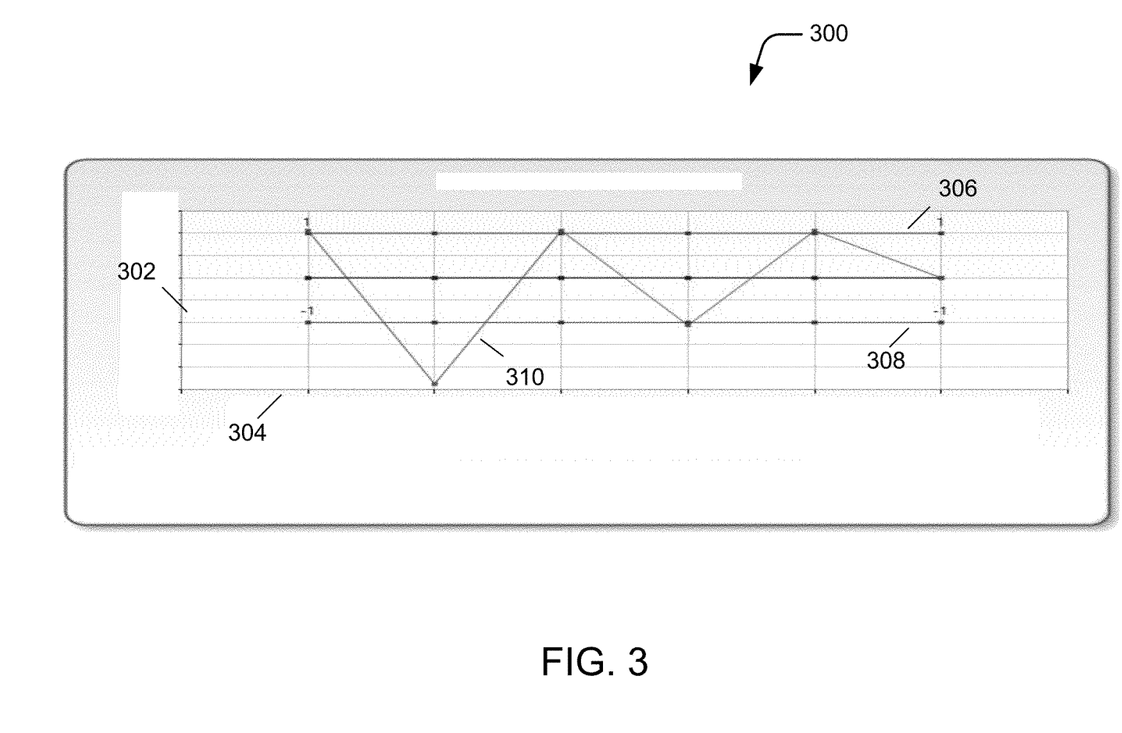
FIG. 3 is a graph illustrating sensor performance over time for determining a calibration interval, according to an embodiment of the invention.

In certain embodiments previously described, an optimal calibration interval may be determined for the one or more power plant sensors based at least in part on the errors detected within the data. FIG. 3 is a graph 300 illustrating the calibration history of one or more power plant sensors. The y-axis 302 of the graph 300 indicates error tolerance. The x-axis 304 of graph 300 indicates time. The upper horizontal line 306 is the upper error tolerance, and the lower horizontal line 308 is the lower error tolerance. The calibration results for the one or more power plant sensors are plotted 310 on the graph 300. Using the graph 300, the sensor performance can be analyzed. In particular, for example, sensor drift can be monitored by analyzing when and how often the sensor falls outside of the error tolerances. Moreover, if a particular sensor includes data outside the error tolerances, that sensor may be disregarded or given less weight when reconciling the errors within the data received by the one or more power plant sensors.

Figure 4:
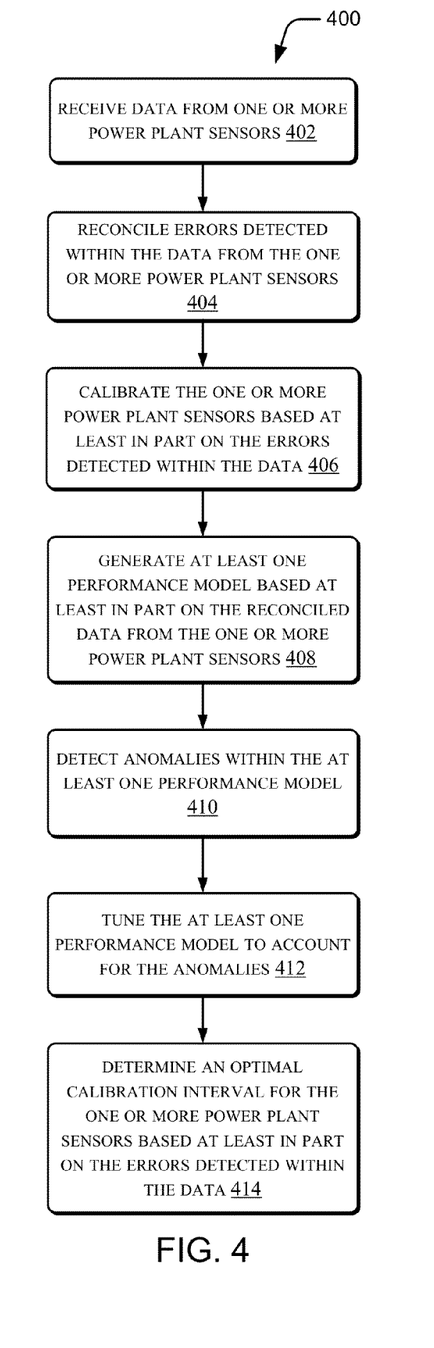
FIG. 4 is a flow diagram illustrating details of an example method for implementing condition-based power plant sensor calibration, according to an embodiment of the invention.

FIG. 4 illustrates an example flow diagram of a method 400 for condition based power plant sensor calibration, in accordance with an embodiment of the invention. In one example, the illustrative computing device 200 of FIG. 2 and/or one or more modules of the illustrative computing device 200, alone or in combination, may perform the described operations of method 400.

In this particular implementation, the method 400 may begin at block 402 of FIG. 4 in which the method 400 may include receiving data from one or more power plant sensors. Further, at block 404, the method 400 may include reconciling errors detected within the data from the one or more power plant sensors. At block 406, the method 400 may include calibrating the one or more power plant sensors based at least in part on the errors detected within the data. At block 408, the method 400 may include generating at least one performance model based at least in part on the reconciled data from the one or more power plant sensors. At block 410, the method 400 may include detecting anomalies within the at least one performance model. At block 412, the method 400 may include tuning the at least one performance model to account for the anomalies. Moreover, at block 414, the method 400 may include determining an optimal calibration interval for the one or more power plant sensors based at least in part on the errors detected within the data.

Illustrative systems and methods are described for condition based power plant sensor calibration. Some or all of these systems and methods may, but need not, be implemented at least partially by architectures such as those shown in FIG. 2 above.

Although embodiments have been described in language specific to structural features and/or methodological acts, it is to be understood that the disclosure is not necessarily limited to the specific features or acts described. Rather, the specific features and acts are disclosed as illustrative forms of implementing the embodiments.

That which is claimed:

1. A method for condition-based power plant sensor calibration, comprising:
   receiving data from one or more power plant sensors;
   reconciling errors detected within the data from the one or more power plant sensors;
   calibrating the one or more power plant sensors based at least in part on the errors detected within the data;
   generating at least one performance model based at least in part on the reconciled data from the one or more power plant sensors, wherein the reconciling errors comprises giving more weight to the one or more power plant sensors that are known to be more reliable, based at least in part on at least one of a calibration history or trends of the one or more power plant sensors stored in a database;
   detecting anomalies within the at least one performance model; and
   tuning the at least one performance model to account for the anomalies.

2. The method of claim 1, wherein reconciling errors detected within the data from the one or more power plant sensors is based at least in part on accessing at least one database of calibration history and trends for the one or more power plant sensors.

3. The method of claim 1, wherein detecting anomalies within the at least one performance model is based at least in part on accessing at least one database of known performance models or actual power plant performance results.

4. The method of claim 1, wherein the detected anomalies within the at least one performance model are based at least in part on equipment performance degradation.

5. The method of claim 1, wherein the errors detected within the data from the one or more power plant sensors are based at least in part on sensor drifting.

6. The method of claim 1, further comprising:
   determining an optimal calibration interval for the one or more power plant sensors based at least in part on the errors detected within the data.

7. The method of claim 1, wherein the data received from the one or more power plant sensors is from a power plant control system or a plant historian module.

8. A system for condition-based power plant sensor calibration, comprising:
   a computer processor; and
   a memory in communication with the computer processor operable to store computer-executable instructions operable to:
   receive data from one or more power plant sensors;
   reconcile errors detected within the data from the one or more power plant sensors;
   calibrate the one or more power plant sensors based at least in part on the errors detected within the data;
   generate at least one performance model based at least in part on the reconciled data from the one or more power plant sensors, wherein the reconciling errors comprises giving more weight to the one or more power plant sensors that are known to be more reliable, based at least in part on at least one of a calibration history or trends of the one or more power plant sensors stored in a database;
   detect anomalies within the at least one performance model; and
   tune the at least one performance model to account for the anomalies.

9. The system of claim 8, wherein reconciling errors detected within the data from the one or more power plant sensors is based at least in part on accessing at least one database of calibration history and trends for the one or more power plant sensors.

10. The system of claim 8, wherein detecting anomalies within the at least one performance model is based at least in part on accessing at least one database of known performance models or actual power plant performance results.

11. The system of claim 8, wherein the detected anomalies within the at least one performance model are based at least in part on equipment performance degradation.

12. The system of claim 8, wherein the errors detected within the data from the one or more power plant sensors are based at least in part on sensor drifting.

13. The system of claim 8, wherein the computer-executable instructions are further operable to determine an optimal calibration interval for the one or more power plant sensors based at least in part on the detected errors within the data.

14. The system of claim 8, wherein the data received from the one or more power plant sensors is from a power plant control system or a plant historian module.

15. A system for condition-based power plant sensor calibration, comprising:
   one or more power plant sensors;
   a computer processor; and
   a memory in communication with the computer processor and operable to store computer-executable instructions operable to:
      receive data from the one or more power plant sensors;
      reconcile detected errors within the data from the one or more power plant sensors;
      calibrate the one or more power plant sensors based at least in part on the detected errors within the data;
      generate at least one performance model based at least in part on the reconciled data from the one or more power plant sensors, wherein the reconciling errors comprises giving more weight to the one ore more power plant sensors that are known to be more reliable, based at least in part on at least one of a calibration history or trends of the one or more power plant sensors stored in a database;
      detect anomalies within the at least one performance model; and
      tune the at least one performance model to account for the anomalies.

16. The system of claim 15, wherein reconciling errors detected within the data from the one or more power plant sensors is based at least in part on accessing at least one database of calibration history and trends for the one or more power plant sensors.

17. The system of claim 15, wherein detecting anomalies within the at least one performance model is based at least in part on accessing at least one database of known performance models or actual power plant performance results.

18. The system of claim 15, wherein the detected anomalies within the at least one performance model are based at least in part on equipment performance degradation.

19. The system of claim 15, wherein the errors detected within the data from the one or more power plant sensors are based at least in part on sensor drifting.

20. The system of claim 15, wherein the computer-executable instructions are further operable to determine an optimal calibration interval for the one or more power plant sensors based at least in part on the detected errors within the data.

* * * * *

UNITED STATES PATENT AND TRADEMARK OFFICE
CERTIFICATE OF CORRECTION

PATENT NO. : 8,892,382 B2
APPLICATION NO. : 13/245486
DATED : November 18, 2014
INVENTOR(S) : Wang et al.

Page 1 of 1

It is certified that error appears in the above-identified patent and that said Letters Patent is hereby corrected as shown below:

In the Claims,

In Column 10, Line 6, in Claim 15, delete "ore" and insert -- or --, therefor.

Signed and Sealed this
Ninth Day of June, 2015

Michelle K. Lee
*Director of the United States Patent and Trademark Office*